Patented Jan. 8, 1935

1,986,787

UNITED STATES PATENT OFFICE 1,986,787

CELLULOSE DERIVATIVE COMPOSITION

Harold J. Barrett, Wilmington, Del., assignor to E. I. du Pont de Nemours & Company, Wilmington, Del., a corporation of Delaware No Drawing. Application May 11, 1933, Serial No. 670,511

19 Claims. (Cl. 134—79)

This invention relates to nitrocellulose coating compositions and more particularly to nitrocellulose compositions containing as a plasticizer castor oil modified by esterification with polybasic organic acids.

This case is a continuation in part of Harold J. Barrett application, Serial No. 479,586, filed September 3, 1930 which has resulted in United States Patent 1,933,697 of Nov. 7, 1933.

At the present time large quantities of castor oil are used in nitrocellulose coating compositions for the purpose of imparting flexibility to the nitrocellulose film. It is known that oils of about the same viscosity as castor oil are produced by treating or esterifying castor oil with monobasic organic acids. It is also old as set forth in German Patent 479,965 that rubber-like masses insoluble in ordinary organic solvents may be produced by treating or esterifying castor oil with a dibasic organic acid, but in so far as I am aware it is new to conduct the treatment or esterification of castor oil with polybasic acids so that the resulting product is an oil of greater viscosity than castor oil, and is soluble in nitrocellulose solvents for the production of nitrocellulose compositions having the improved properties as disclosed herein.

This invention has as an object the production of nitrocellulose films containing improved softening agents. A further object is the production of nitrocellulose films having a higher exudation temperature for the softener contained therein than a castor oil softened film. Other objects will appear hereinafter.

These objects are accomplished by the following invention wherein there is used as a softener for nitrocellulose films, castor oil which has been heat treated with a polybasic organic acid capable of yielding a viscous oil. This viscous oil is soluble in nitrocellulose solvents when certain relative quantities of oil and acid are used and when the heat-treatment is conducted under the conditions of temperature and time as disclosed herein.

Castor oil consists of about 85% of the triglyceride of ricinoleic acid. As such, the oil contains hydroxyl groups which are capable of being changed into ester groups by treatments with various acids, acid anhydrides, and acyl halides. The esterification of these hydroxyl groups with monobasic organic acids, anhydrides, or acyl halides results in oils having viscosities not appreciably different from castor oil itself (about six poises). Nitrocellulose films containing these oils, as well as films containing castor oil itself, are subject to the disadvantage that the oil exudes at rather low temperatures. It has now been discovered that, if the heat-treatment or esterification is effected with polybasic acids under the proper conditions, viscous oils soluble in nitrocellulose solvents are obtained which are especially suitable as softening agents for nitrocellulose films because these oils do not exude at such low temperatures, and because they increase the flexibility and toughness of the film, both initially and after aging.

Methods of preparing my improved softening agents from castor oil and polybasic acids are as follows:

Example I

A mixture of 81.3% of castor oil and 18.7% of phthalic anhydride is heated, with or without stirring or blowing with $CO_2$, at a temperature of 220° C. until the acid number of the mixture reaches approximately 15, about eleven or twelve hours of heating being required to reach the desired acid number. The product I obtain by this reaction is a light brown oil of a viscosity of 471 poises. It may be used as such without further purification.

Example II

A mixture of 82.8% of castor oil and 17.2% of maleic acid is heated, with or without stirring or blowing with $CO_2$, for seven hours at 200° C. The light-brown oil which is formed has an acid number of about 29 and a viscosity of about 800 poises. With these proportions of maleic acid and castor oil a lower acid number cannot generally be obtained because of gelation of the mixture and consequent insolubility of the product in nitrocellulose solvents. The product may be used as such without further purification.

Example III

A mixture of 77.1% of castor oil and 22.9% of naphthalic acid is heated, with or without stirring or blowing with $CO_2$, at a temperature of 250° C. for about nine hours, or until the acid number of the mixture has reached approximately 3.0. Because of the high melting point of the naphthalic acid and its relative insolubility in castor oil, a high temperature of preparation (i. e., 250° C.) must be used. Consequently the product so obtained is dark in color and has a relatively low viscosity (about 75 poises).

Example IV

A mixture of 90% of castor oil and 10% of citric acid is heated, with or without stirring or blowing with $CO_2$, at 250° C. for six hours or until the acid number of the mixture reaches about 10. The product obtained by this heat-treatment is a yellow, viscous oil (about 75 poises). It may be used as such without further purification.

Example V

A mixture of 86.3% of castor oil and 13.7% of fumaric acid is heated, with or without stirring or blowing with $CO_2$, for four hours at 200° C. The product is a light brown, viscous oil (about 700 poises) with an acid number of about 33. Attempts to make a product of appreciably lower acid number from these proportions of castor oil and fumaric acid result in the gelation of the mixture and consequent insolubility of the product in nitrocellulose solvents. The product may be used as such without further purification.

Example VI

A mixture of 84.5% of castor oil and 15.5% of succinic acid is heated, with or without stirring or blowing with $CO_2$, for four hours at 200° C. The product is a brown, viscous oil (about 350 poises) having an acid number of about 41. Gelation of the mixture and consequent insolubility in nitrocellulose solvents results upon further heating to reduce the acid number when these proportions of acid and oil are used. The product may be used as such without further purification.

Example VII

A mixture of 90.9% of castor oil and 9.1% of aconitic acid is heated, with or without stirring or blowing with $CO_2$, for seven hours at 200° C. The product is a yellow, moderately viscous oil (about 65 poises), having an acid number of 6.6. The low viscosity of the product is in all probability due to a decomposition of the aconitic acid which occurs during the heat-treatment.

Example VIII

A mixture of 83.2% of castor oil and 16.8% of adipic acid is heated, with or without stirring or blowing with $CO_2$, for five hours at 225° C. The product is a light brown, viscous oil (about 900 poises) having an acid number of 24.8. Attempts to make a product of lower acid number from these proportions of castor oil and adipic acid result in the gelation of the mixture and consequent insolubility of the product in nitrocellulose solvents. The product may be used as such without further purification.

Mixtures of polybasic acids may be used in the treatment of the castor oil according to the procedure exemplified above. Thus, adipic acid, or other polybasic acid, may replace a part of the phthalic anhydride mentioned in Example I. If desired, the esterification of the castor oil may be effected partly by a polybasic acid and partly by a monobasic acid. This result may be conveniently attained by using a mixture of a polybasic acid and a monobasic acid, and conducting the heat-treatment in accordance with the procedure previously set forth. All of these products, made by reacting castor oil with polybasic acids, or mixtures thereof, or with mixtures of polybasic and monobasic acids, are useful as softening agents in nitrocellulose coating compositions.

A typical example of a nitrocellulose composition containing these improved softeners for use in coating fabrics, for the preparation of artificial leather, or for coating paper, or other material constituting flexible backing, is as follows:

Example IX

| | Per cent by weight |
|---|---|
| Nitrocellulose (5 sec. viscosity) | 11.8 |
| Castor oil phthalate | 19.6 |
| Dibutyl phthalate | 2.2 |
| Pigment | 10.3 |
| Solvent | 56.1 |
| | 100.0 |

A clear lacquer composition containing these improved softener compositions and suitable as a coating, or a paint on a non-flexible backing is as follows:

Example X

| | Per cent by weight |
|---|---|
| Nitrocellulose (½ sec. viscosity) | 6.5 |
| Ester gum | 1.8 |
| Dibutyl phthalate | 2.1 |
| Castor oil phthalate | 1.6 |
| Solvent | 88.0 |
| | 100.0 |

The maximum amount of acid that can be used with a definite amount of oil is about one equivalent of acid to one equivalent of oil, these equivalent amounts being based on the acid number of the acid and on the acetyl value of the oil. The maximum amount of acid can be readily calculated from these values by workers skilled in the art. It is to be understood that the term equivalent as used in the claims is essentially the maximum quantity of acid that may be used with a given weight of oil as defined above. This varies with different dibasic acids. If more than one equivalent of acid is used for one equivalent of oil, gelation of the mixture, when heated, occurs at a very high acid number with the formation of rubber-like or gummy masses which are practically insoluble in nitrocellulose solvents. The minimum ratio of acid and oil, below which the viscosity of the product is less than the preferred value, is about three tenths equivalent of acid to one equivalent of oil, based on the acid number of the acid and on the acetyl value of the oil.

Treatment of the castor oil to produce my improved softening agents, assuming the ratios of acid and oil are as stated, is dependent upon both the temperature and time of heating. With higher temperatures, the time of heating is correspondingly short, and with lower temperatures the time of heating must be proportionally increased. The highest temperature that can be used is limited by the temperature at which decomposition of the castor oil takes place in the presence of the particular acid, acid anhydride, or acyl halide used. The lower temperatures that may be used are limited only by those below which no appreciable esterification occurs, but in any event the reaction must be stopped before the point at which gelation takes place, because the gelled oil is not suitable for the purposes of the present invention. The viscosity of the product, when made under the proper conditions of proportion, time and temperature as indicated above, does, however, vary somewhat in accordance with the temperature at which the reaction is effected. That is, if the reaction takes place at a relatively high temperature for a short time, the product is less viscous than when the reaction is effected at a lower temperature during a longer time. The viscosities of my improved modified castor oil products, useful as improved softening agents in nitrocellulose compositions, preferably lie within the range of approximately 200 to 500 poises, but viscosities lying within the range of 65 to 1000 poises are suitable.

The modified castor oil made with phthalic anhydride, as in Example I, is especially valuable as a softening agent for nitrocellulose films because of its relatively high exudation temperature. The proportions set forth in this example, one equivalent of castor oil and one equivalent of phthalic anhydride, represent about the largest proportional amount of phthalic anhydride that may be used. The minimum amount of phthalic anhydride that should be used with one equivalent of castor oil is about three tenths of an equivalent. While I prefer to conduct the reaction in the proportions given in Example I, at a temperature of about 200° C., the reaction may be effected between the temperature range of 165° C. to 231° C., yielding a product ranging between 1000 poises in viscosity for the lower temperature to 65 poises for the higher temperature. The time of heating is, of course, less for the higher temperature. It is to be noted, however, that viscosity values will vary somewhat in accordance with the conditions of preparation. Thus, variations may occur because of the loss of anhydride or acid during the heating, this depending to some extent upon the size of the charge.

Not all polybasic organic acids or their anhydrides give rise to viscous oils (above 65 poises) when heated with castor oil. Examples of polybasic acids which do not produce the desired products are oxalic, malonic and tartaric acids. Thus oxalic acid gives formates, and malonic acid gives acetates, which are esters of monobasic acids and are not of the proper viscosity. Because of certain factors mentioned in the specific examples, naphthalic acid and aconitic acid-treated castor oils are not highly valued. Usually the suitability of the product depends on whether or not the acid employed is stable at the temperature at which the preparation must be conducted, that is, yields derivatives of polybasic acids at that temperature. Hexahydrophthalic, sebacic, isophthalic, azelaic, terephthalic, glutaric, suberic and tricarballylic acids are likewise suitable. This invention therefore resides in the treatment of castor oil with those polybasic organic acids which are stable at the temperature at which the preparation must be conducted and which are capable of yielding a product miscible with nitrocellulose. It is to be understood that the term polybasic organic acid as used in the claims is so defined.

It is to be noted, however, that the proportions of combined oil and acid in the resulting product are not necessarily the same as the proportions in which the ingredients were reacted to produce the product because of the volatility of the components and the loss of water formed by the reaction. It is possible, therefore, that the desired product may be obtained by using a quantity of volatile acid or anhydride greater than one equivalent, if the reaction is conducted under conditions permitting excessive loss of volatile products.

Proportions of a modified castor oil, nitrocellulose, pigment, solvent, or gum varying from those given in the examples may be used, as will be understood by those skilled in the art. The modified castor oil softener may constitute the total softening agent, or, if desired, my improved softening agents may be advantageously used with other known softeners. As indicated by the dibutyl phthalate included in Examples IX and X, it is desirable to include bonding or blending agents such as dibutyl phthalate, tricresyl phosphate, blown castor and cottonseed oils, etc. Various natural or synthetic resins may be used instead of the ester gum mentioned in Example X. Among the synthetic resins may be mentioned the polyhydric alcohol-polybasic acid resins, such as those made from glycerol, phthalic anhydride, and a modifying or solubilizing agent.

Nitrocellulose compositions containing my improved softeners, while of greatest value for coating fabrics, may also be used for coating purposes generally, as for coating wood, metal, paper, etc., with or without waxes, (such as paraffin) resins, other softeners, and the like. As an example, they are highly advantageous as the topcoats or undercoats for the metal bodies of automobiles. By proper adjustment of proportion of softener and nitrocellulose, in accordance with known technique, the compositions of this invention can also be used as molding plastics, safety-glass, adhesives or inner-layers, impregnating agents, etc.

On aging, a film formed from a nitrocellulose coating composition as given in Example IX containing my improved softening agents has much greater toughness, and shows better flexibility than a castor oil softened film. Castor oil, as a softening agent for pyroxylin films, is subject to the disadvantage that it will exude from the film when the film is heated to a certain temperature. For instance, a castor oil softened nitrocellulose composition will exude the oil between 60 and 66° C., whereas a similar film containing a castor oil phthalate in a composition such as Example IX, will not exude the softener until a temperature of about 93° to 107° C. is reached. The improved flexibility, before and after aging, of films containing my improved softening agents is shown by subjecting the films to a "scrubbing" test in which the coated faces of a fabric are rubbed together until the coating is broken. A fabric coated with a composition as set forth in Example IX has been found to "scrub" initially from 600 to 1000 times, and after four weeks' aging at 65° C. to "scrub" 80 to 100 times; a similar fabric coated with a composition containing castor oil as the total softener "scrubs" initially from 100 to 200 times, and after aging for four weeks at 65° C. "scrubs" from 0 to 60 times.

As many apparently widely different embodiments of this invention may be made without departing from the spirit and scope thereof, it is to be understood that I do not limit myself to the specific embodiments thereof except as defined in the appended claims.

I claim:

1. A film comprising nitrocellulose and a reaction product miscible therewith comprised of the reaction product of castor oil with a polycarboxylic organic acid wherein the hydroxyl groups of said castor oil are esterified by the polycarboxylic acid.

2. A coating composition comprising nitrocellulose and a reaction product miscible therewith comprised of the reaction product of castor oil with a polycarboxylic organic acid wherein the hydroxyl groups of said castor oil are esterified by the polycarboxylic acid.

3. A coating composition comprising nitrocellulose, a resin, and a reaction product miscible with nitrocellulose comprised of the reaction product of castor oil with a polycarboxylic organic acid wherein the hydroxyl groups of said castor oil are esterified by the polycarboxylic acid.

4. A coating composition comprising nitrocellulose, a blending agent, and a reaction product miscible with nitrocellulose comprised of the reaction product of castor oil with an organic polycarboxylic acid wherein the hydroxyl groups of said castor oil are esterified by the polycarboxylic acid.

5. A coating composition comprising nitrocellulose, dibutyl phthalate, and a reaction product miscible with nitrocellulose comprised of the reaction product of castor oil with a polycarboxylic organic acid wherein the hydroxyl groups of said castor oil are esterified by the polycarboxylic acid.

6. A coating composition comprising nitrocellulose and a viscous oil, said oil comprising the reaction product of castor oil with a polycarboxylic organic acid wherein the hydroxyl groups of said castor oil are esterified by the polycarboxylic acid.

7. A coating composition comprising nitrocellulose and an oil of about 65 to 1000 poises viscosity, said oil comprising the reaction product of castor oil with a polycarboxylic organic acid wherein the hydroxyl groups of said castor oil are esterified by the polycarboxylic acid.

8. A coating composition comprising nitrocellulose and a viscous oil, said oil comprising the reaction product of castor oil with an aromatic dicarboxylic acid anhydride wherein the hydroxyl groups of said castor oil are esterified by said aromatic dicarboxylic acid anhydride.

9. A coating composition comprising nitrocellulose and a viscous oil, said oil comprising the reaction product of castor oil with phthalic anhydride wherein the hydroxyl groups of said castor oil are esterified by said phthalic anhydride.

10. A coating composition comprising nitrocellulose and a viscous oil, said oil comprising the reaction product of one equivalent of castor oil with from three tenths to one equivalent of a polycarboxylic organic acid wherein the hydroxyl groups of said castor oil are esterified by the polycarboxylic acid.

11. A coating composition comprising nitrocellulose and a viscous oil, said oil comprising the reaction product of one equivalent of castor oil with from three tenths to one equivalent of phthalic anhydride wherein the hydroxyl groups of said castor oil are esterified by said phthalic anhydride.

12. A coating composition comprising nitrocellulose and an oil of between 65 to 1000 poises which comprises the reaction product of 15 to 4.4 parts by weight of castor oil with about one part of phthalic anhydride wherein the hydroxyl groups of said castor oil are esterified by said phthalic anhydride.

13. A coating composition comprising nitrocellulose and a viscous oil which comprises the reaction product of about 4.4 parts by weight of castor oil with about one part of phthalic anhydride wherein the hydroxyl groups of said castor oil are esterified by said phthalic anhydride.

14. A coating composition comprising nitrocellulose and an oil of about 65 to 1000 poises viscosity, said oil comprising the reaction product of phthalic anhydride and castor oil wherein the hydroxyl groups of said castor oil are esterified by said phthalic anhydride, the analysis of the first named oil showing from about 4% to 18% of combined phthalic anhydride.

15. A coating composition comprising nitrocellulose and a viscous oil, said oil comprising the reaction product of phthalic anhydride with castor oil wherein the hydroxyl groups of said castor oil are esterified by said phthalic anhydride, the analysis of said viscous oil showing about 12% of combined phthalic anhydride.

16. A coating composition comprising nitrocellulose, a pigment and a reaction product miscible with nitrocellulose comprised of the reaction product of castor oil with a polycarboxylic organic acid wherein the hydroxyl groups of said castor oil are esterified by the polycarboxylic acid.

17. A coating composition comprising nitrocellulose, a pigment, a solvent and a reaction product miscible with nitrocellulose comprised of the reaction product of castor oil with a polycarboxylic organic acid wherein the hydroxyl groups of said castor oil are esterified by the polycarboxylic acid.

18. A coated fabric whereof the coating comprises nitrocellulose and a viscous oil miscible therewith comprised of the reaction product of castor oil with a polycarboxylic organic acid wherein the hydroxyl groups of said castor oil are esterified by the polycarboxylic acid.

19. A fabric coated with a composition comprising nitrocellulose and the reaction product of castor oil with an organic polycarboxylic acid wherein the hydroxyl groups of said castor oil are esterified by the polycarboxylic acid, said reaction product being an oil of 60–1000 poises viscosity, compatible with nitrocellulose and soluble in nitrocellulose solvents.

HAROLD J. BARRETT.

CERTIFICATE OF CORRECTION.

Patent No. 1,986,787.  January 8, 1935.

HAROLD J. BARRETT.

It is hereby certified that error appears in the printed specification of the the above numbered patent requiring correction as follows: Page 3, first column, line 20, for "200°" read 220°; and that the said Letters Patent should be read with this correction therein that the same may conform to the record of the case in the Patent Office.

Signed and sealed this 19th day of March, A. D. 1935.

Leslie Frazer (Seal) Acting Commissioner of Patents